Jan. 8, 1935.   J. C. CHAPMAN ET AL   1,986,793
MACHINE FOR FORMING GEARS AND THE LIKE
Filed Jan. 18, 1932   6 Sheets-Sheet 1

Jan. 8, 1935.  J. C. CHAPMAN ET AL  1,986,793
MACHINE FOR FORMING GEARS AND THE LIKE
Filed Jan. 18, 1932  6 Sheets-Sheet 3

John C. Chapman, Dec'd.
by Hartford National Bank
and Trust Company, Executor
and Frederick Miller
INVENTORS BY Gifford, Scull &
Burgess
ATTORNEYS

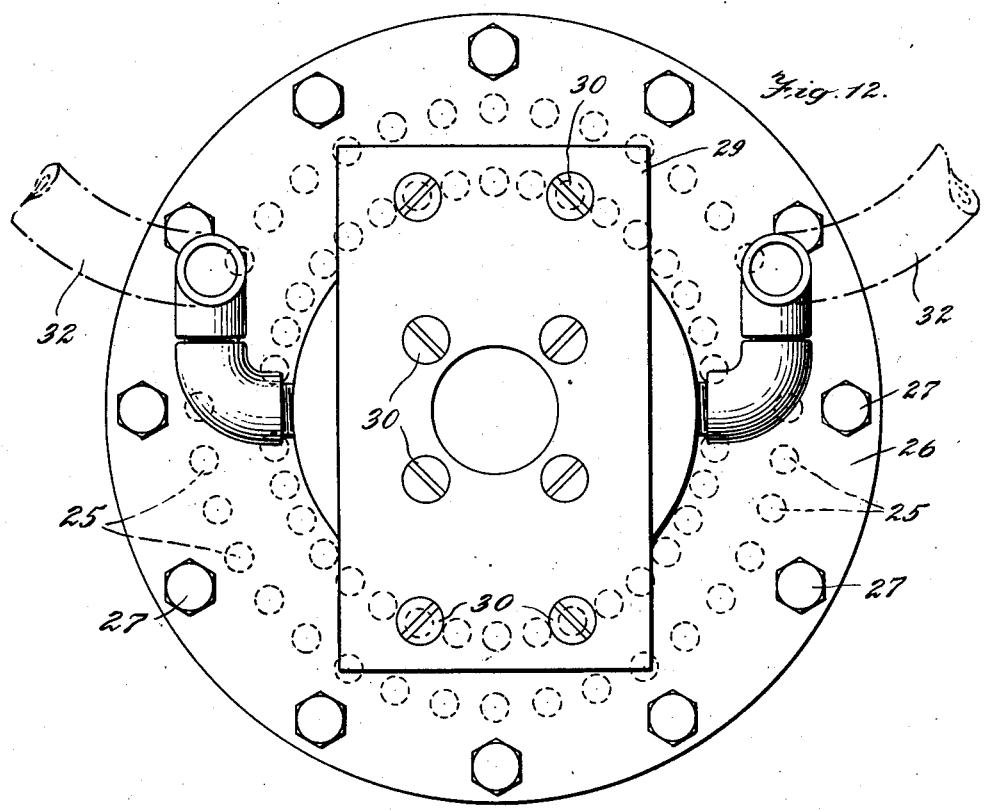
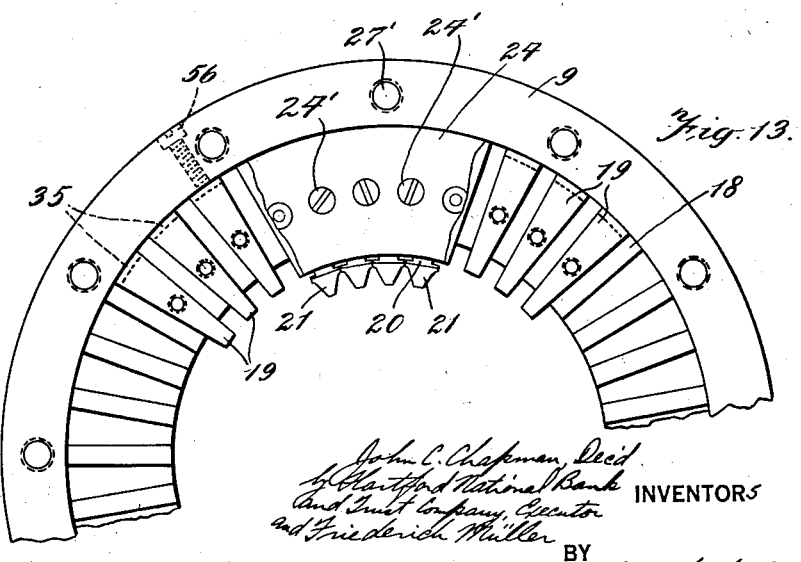

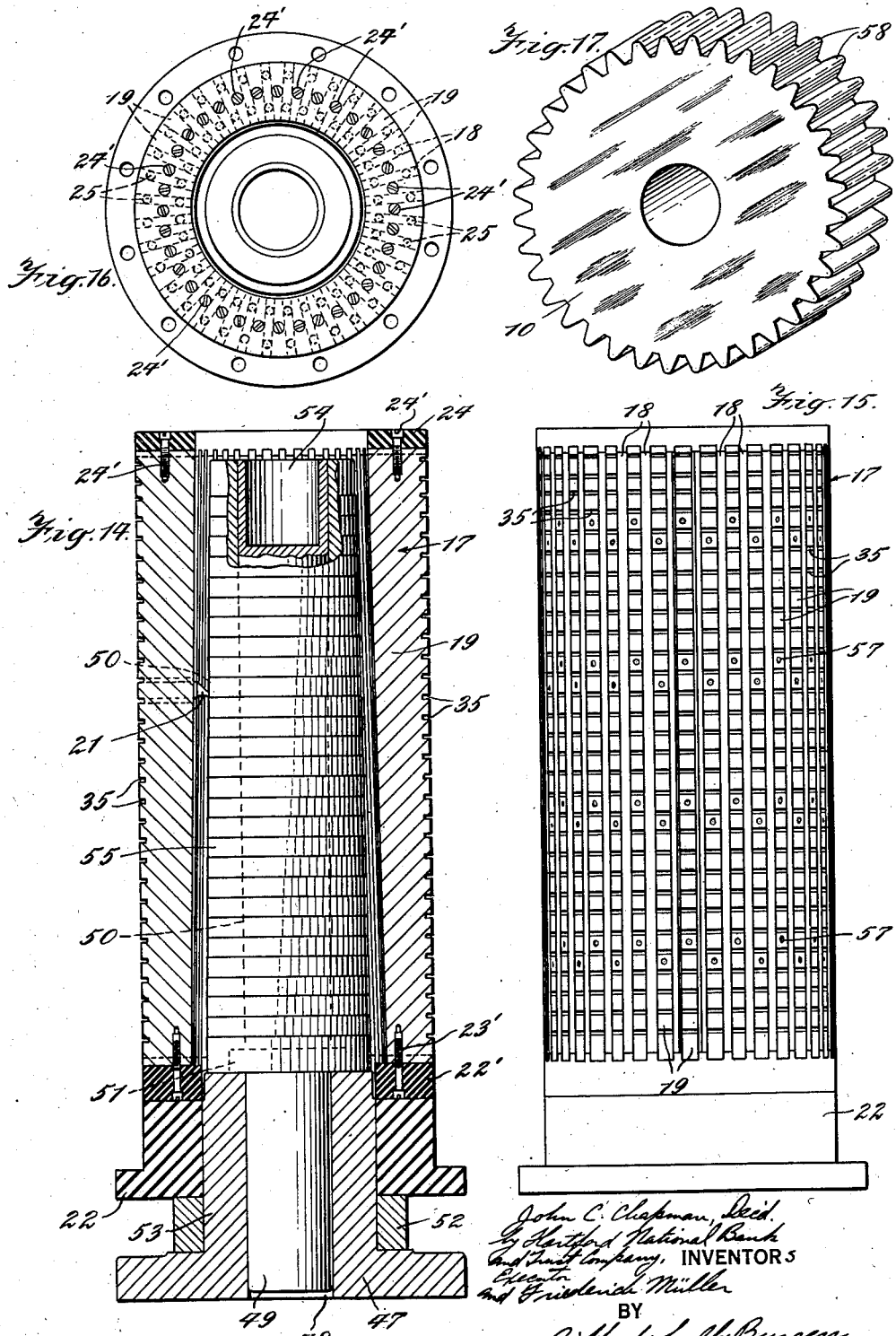

Jan. 8, 1935. J. C. CHAPMAN ET AL 1,986,793
MACHINE FOR FORMING GEARS AND THE LIKE
Filed Jan. 18, 1932 6 Sheets-Sheet 6
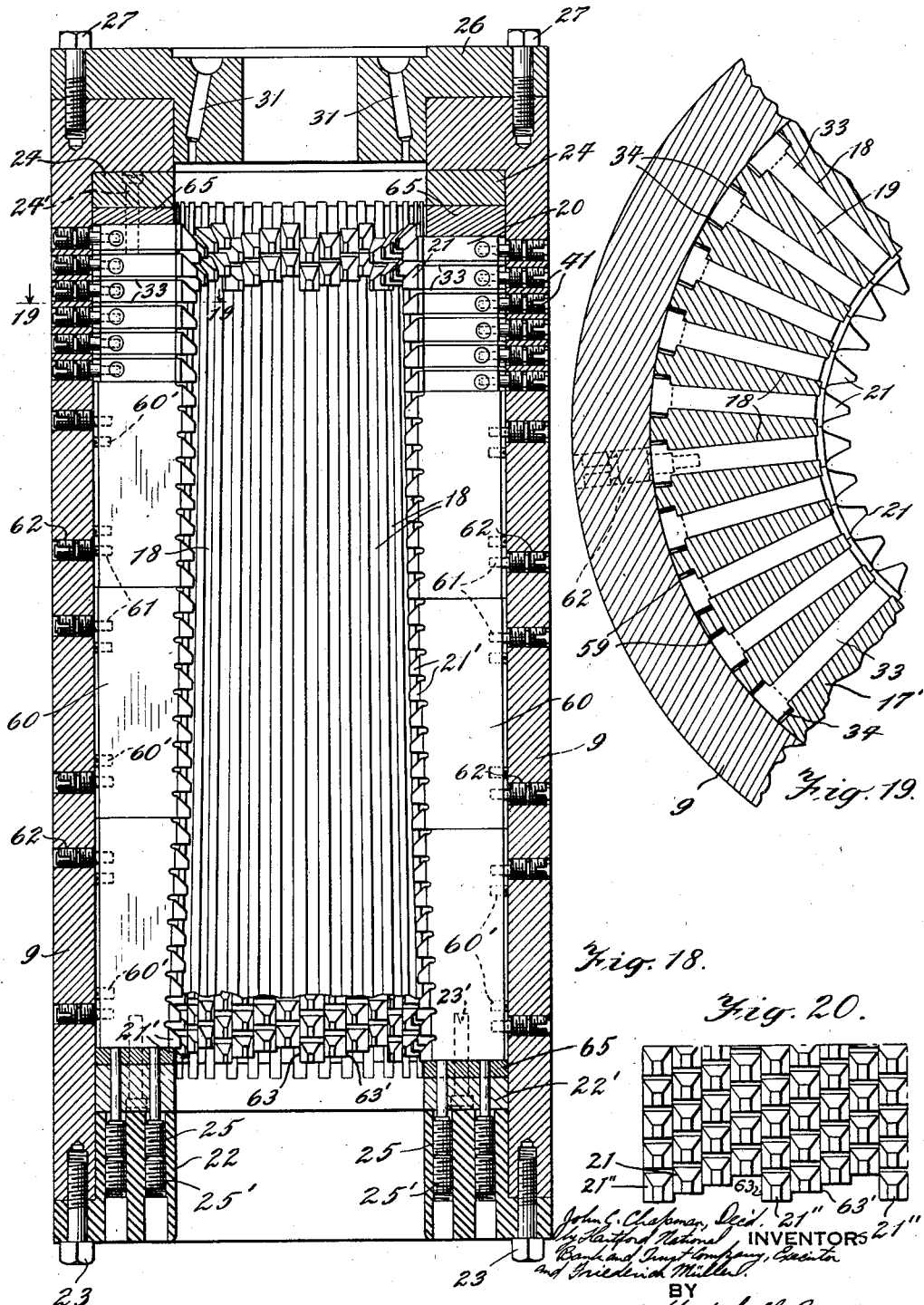

Patented Jan. 8, 1935

1,986,793

UNITED STATES PATENT OFFICE 1,986,793

MACHINE FOR FORMING GEARS AND THE LIKE

John C. Chapman, deceased, late of West Hartford, Conn., by Hartford National Bank and Trust Company, Hartford, Conn., executor, and Friederich Müller, Elizabeth, N. J., assignors to The Whitney Mfg. Co., Hartford, Conn., a corporation of Connecticut Application January 18, 1932, Serial No. 587,218

27 Claims. (Cl. 90—8)

This invention relates to a novel and improved mechanism for cutting gears and the like, and is related to the invention disclosed and claimed in the copending application of Friederich Müller, Serial No. 508,265.

The novel features of the invention will be best understood from the following description and the annexed drawings, in which we have shown selected embodiments of the invention, and in which:

Fig. 6 is an edgewise view of one of the holding members shown in Figs. 2, 3, 4, and 5.

Fig. 7 is a vertical elevation of one of the cutting teeth shown in Figs. 2, 3, and 4.

Fig. 8 is a top view of the holding member shown in Fig. 6.

Fig. 9 is a horizontal view, partly in plan and partly in section, of the tooth appearing in Fig. 7.

Figs. 10 and 11 are views of the tooth holding and adjusting means shown in Figs. 2, 3, 4, and 5.

Fig. 12 is a top view of the structure shown in Fig. 2.

Fig. 13 is a horizontal view through the structure appearing in Fig. 2, this view being taken on several different planes so as to better illustrate the invention.

Fig. 14 is a view showing the way in which the structure in Fig. 2 is assembled, the tool holder being omitted.

Fig. 15 is an elevation of the outside of the structure seen in Fig. 14.

Fig. 16 is a top view of the structure of Fig. 14.

Fig. 17 is a perspective view of one of the gears which may be formed with our new mechanism.

Fig. 18 is a view corresponding to Fig. 2, but showing a different embodiment which the invention may take.

Fig. 19 is a fragmentary horizontal section taken approximately on the line 19—19 of Fig. 18.

Fig. 20 is a developed view of the interior of the cage having the cutting elements in place therein.

Figure 1:
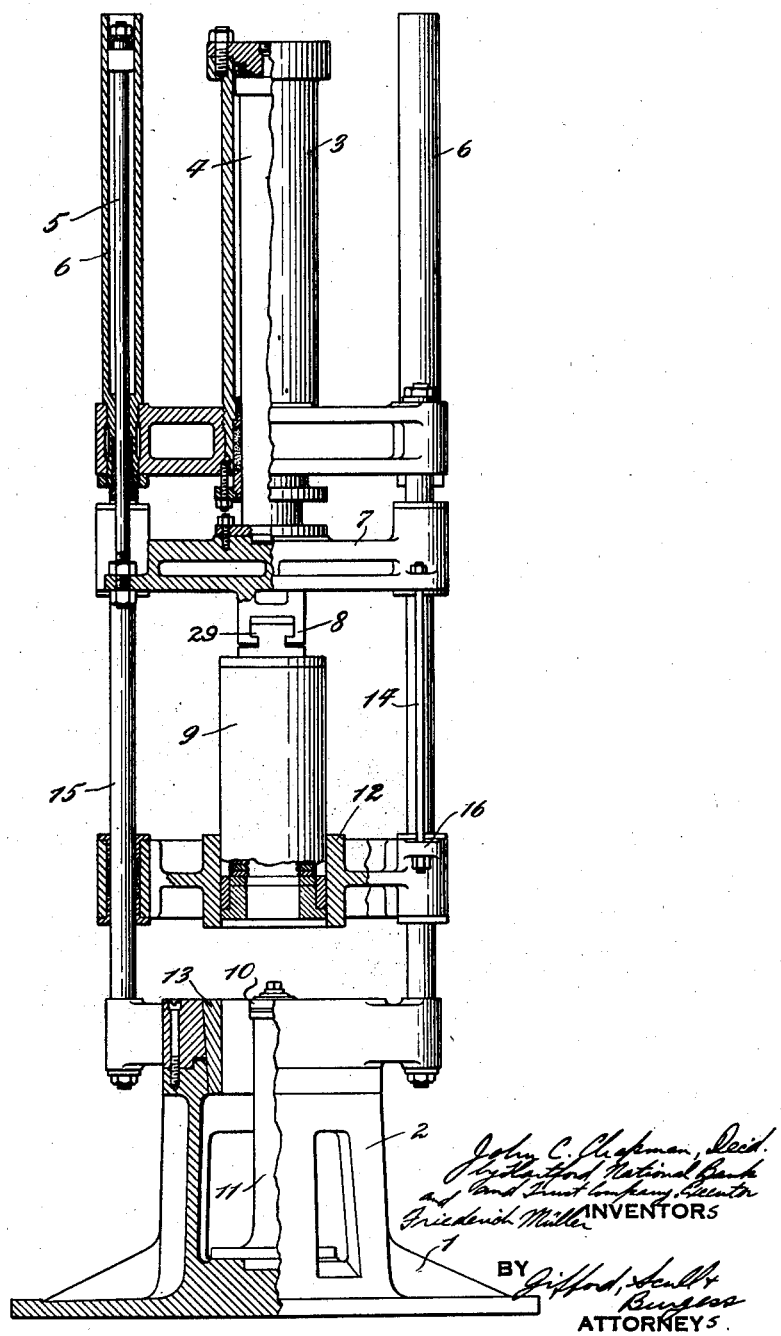
Fig. 1 is a vertical view, partly in elevation and partly in section, showing one embodiment of the invention in place in a hydraulic press ready for operation.

Referring to Fig. 1, there is shown therein a press comprising a base 1 from which extends upwardly a frame 2, this frame supporting a cylinder 3 containing a piston or ram 4, and the frame also supporting cylinders 5 containing pistons 6 for lifting the ram and associated structure.

The ram is connected to a head 7 having means 8 for supporting thereon a tool holder 9. This tool holder contains tools adapted to act on a blank 10 supported on a standard 11. The tool holder is slidably mounted in a guide 12 which is in axial alignment with the standard and with a fixed guide 13.

The guide 12 is held in the position shown in Fig. 1 by means of a plurality of rods 14, one only of which appears in this figure. When the ram forces the tool holder 9 downwardly, the blank 10 is acted upon by the tools carried by the holder, and the guide 12 which is slidably mounted on rods 15 will drop with the ram until it comes in contact with the guide 13 and then the rods 14 will slide in ears 16 connected to the guide 12, while the guides 12 and 13 form, in effect, a continuous guiding means for the tool holder while the tools are operating on the blank 10.

The above arrangement has been more fully described and claimed in the aforesaid copending application, and the invention of this case resides more particularly in the construction and arrangement of the tools in the holder 9.

Referring now more particularly to Figs. 2 to 16, inclusive, the tool holder 9 is in the form of a tubular sleeve within which is received a cage 17. This cage has a plurality of vertically extending grooves 18 therein, these grooves being formed by vertically extending partitions 19 of wedge form set into rings 22' and 24 at the top and bottom, respectively, and secured thereto by screws 23' and 24'. The cage thus is of hollow cylindrical form, and the grooves 18 extend transversely through the wall of the cylinder.

Figure 2:
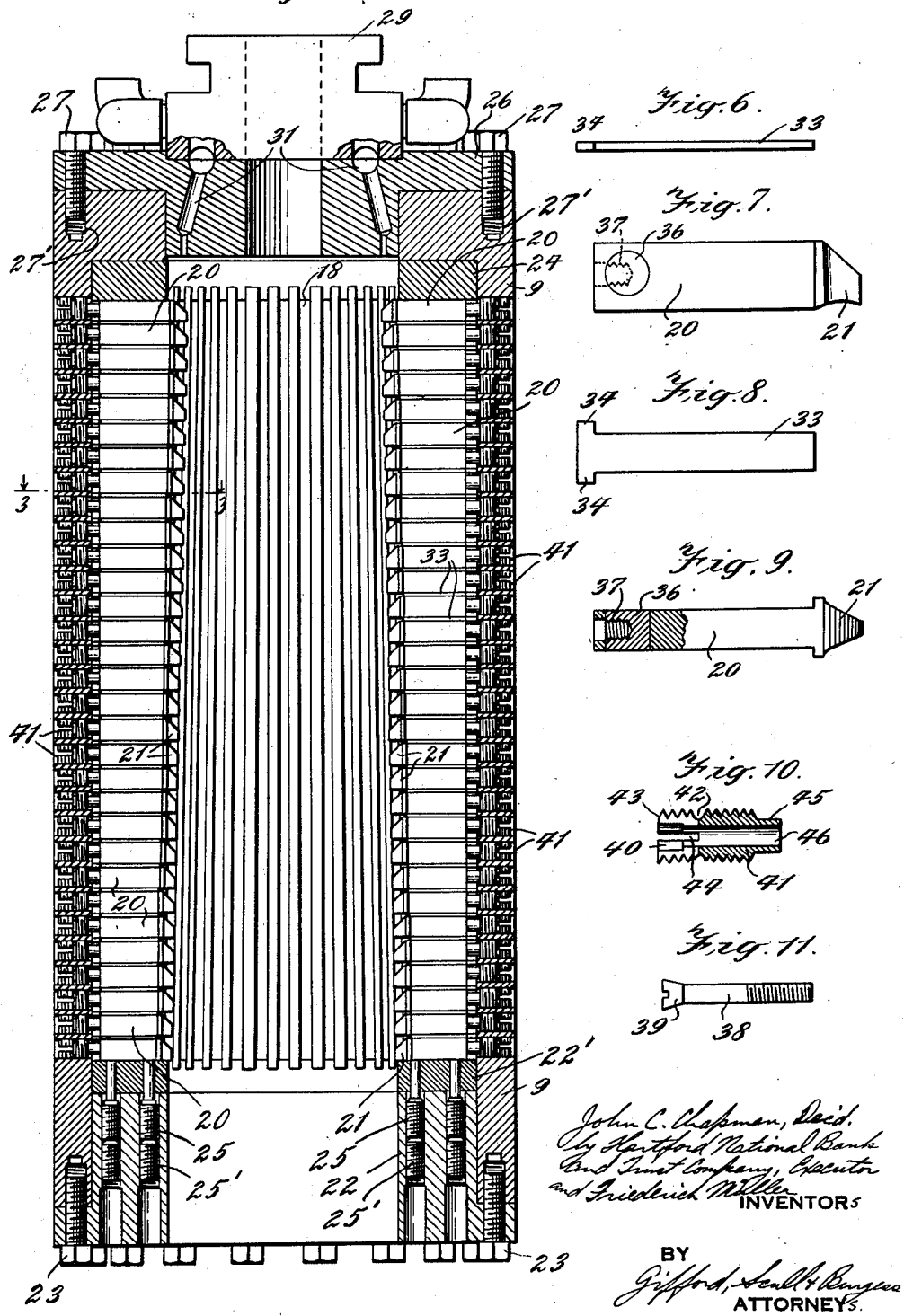
Fig. 2 is a vertical sectional view through the tool holder.
Figure 3:
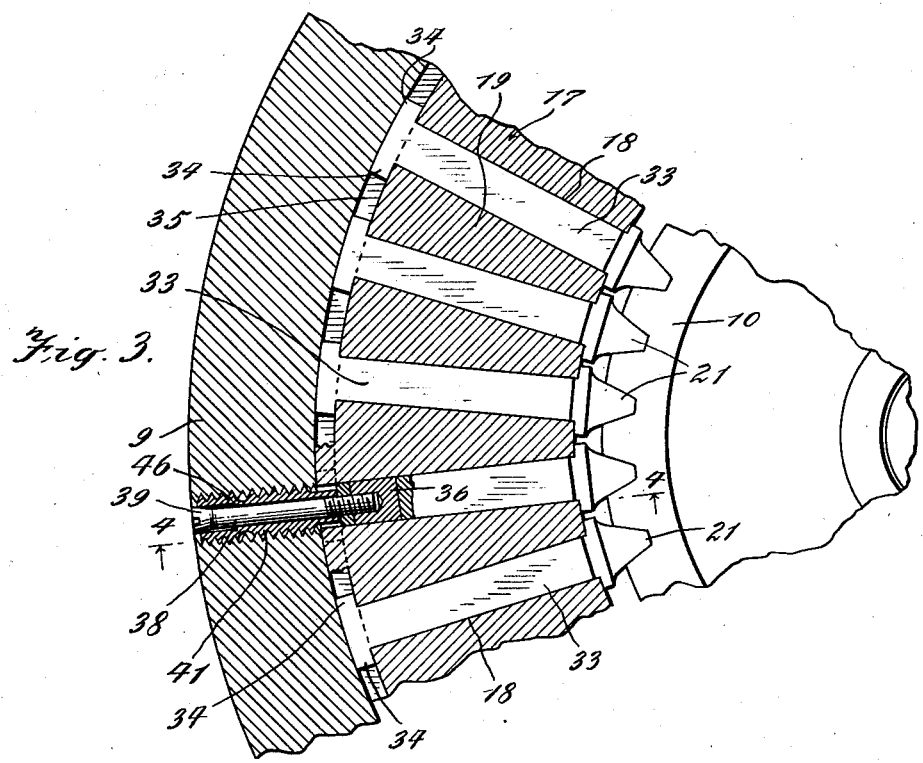
Fig. 3 is a fragmentary section on an enlarged scale and taken approximately on the line 3—3 of Fig. 2.
Figure 4:
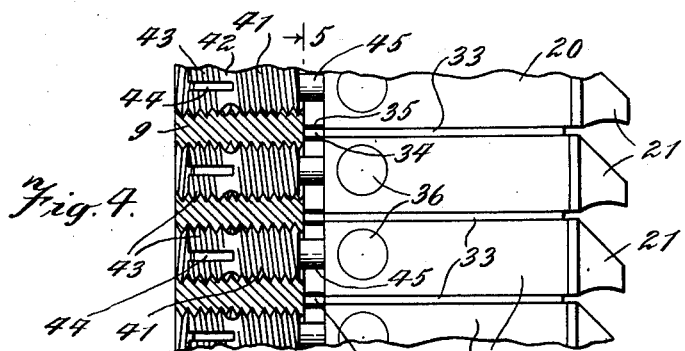
Fig. 4 is a fragmentary view on an enlarged scale and taken approximately on the line 4—4 of Fig. 3.
Figure 5:
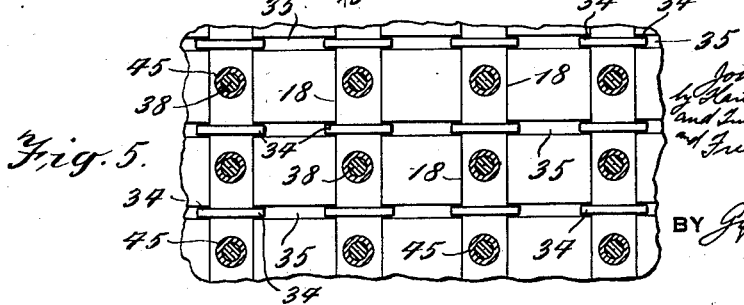
Fig. 5 is a view taken approximately on the line 5—5 of Fig. 4.

Disposed in the grooves is a plurality of individual cutting elements shown as teeth 20, these teeth being of varying length, with the shorter teeth at the bottom and the longer ones at the top, as plainly shown in Fig. 2. Each element may comprise one or more teeth, as desired. By this arrangement, a vertical row of teeth forms a broach, so that the lower tooth takes out the first chip from the space between two teeth of the gear, and each succeeding tooth will take out a further chip until the space is formed. Each tooth is, of course, provided with a cutting edge 21, which may be of any suitable form to give the desired shape to the teeth on the blank 10.

Placed within the holder 9 at the bottom thereof, is a ring 22 above which is the ring 22' upon which rest the bottom teeth 20. In this connection, in Fig. 2, we have shown only two vertical rows of teeth, the teeth being omitted from the other grooves 18 so as to show the relation of these grooves. It is to be understood, however, that each groove will normally receive a row of teeth, so that the spaces between all of the teeth on the gear may be formed by the one operation without the necessity for the usual indexing of the blank, as has been comomn in prior art practice. The ring 22 may be held to the holder 9 as by screws 23.

At its upper end, the holder is provided with an inwardly extending flange overlying the ring 24 which contacts with the top of the uppermost teeth and also with the tops of the partitions 19. The teeth may be forced together by means of screws 25 threaded into the ring 22 and having stems extending through the ring 22' into engagement with the lowermost teeth. The screws 25 may be protected by screws 25'. A cover 26 may be secured in position on the holder 9 as by screws 27 received in holes 27' (Fig. 13).

A suitable projection 29 may be provided on the cover for engagement with the means 8, in this instance this projection being shown as a separate piece secured to the cover as by screws 30. The cover is provided with ducts 31 which are connected with hose 32 whereby water, lubricant, or other cooling fluid may be discharged over the cutting teeth.

In order to prevent buckling inwardly of the teeth 20 when they are tightened, we use holding members 33, and in this embodiment we have shown a holding member between each two teeth, although if found desirable, a smaller number may, of course, be used. Each holding member is preferably of the T-shaped form indicated in Figs. 3, 6, and 8, and the head of the T provides oppositely extending projections 34 which are received in a circumferential groove 35 on the exterior of the cage 17. By this arrangement, the holding members are prevented from moving inwardly, and their frictional engagement with teeth on opposite sides thereof hold the teeth against inward displacement. This arrangement also permits adjustment of a tooth without interfering with adjacent teeth.

Provision is made for individual adjustment of the teeth towards and from the center of the tool holder. For such adjustment we provide each tooth with a transversely extending bore in which is received a plug 36 of relatively soft steel, and this plug is threaded as indicated at 37 to receive the threaded end of a screw 38, the head 39 of which is received in a recess 40 in a screw 41 threaded into the wall of the tool holder 9.

The screw 41 is provided with a circumferential groove 42, and between this groove and its outer end the screw is divided into a plurality of segments 43 by means of longitudinally extending slots 44. By this means, when the head 39 is forced into the recess 40, it being understood that the head fits tightly therein, this will force the segments 43 outwardly to bind the screw 41 in place. The screw 41 is further provided with an end 45 adapted to contact with the outer end of a tooth, and is also provided with a longitudinally extending bore 46 through which the screw 38 passes. By this arrangement, accurate adjustment can be made, the screw 41 being manipulated by a screw driver or other tool received in the slots 44, and the screw 38 being operated at the same time by another suitable tool. Then the teeth may be clamped in place by the screws 25 forcing the teeth upwardly against the flange which, as noted above, is integral with the cage 17.

While we have shown a screw adapted to move a tool in both directions, the inner screw 38 may be omitted as shown, for example, in Fig. 2. This is sometimes done when the spacers or holding members 33 are employed, these spacers being relied upon to prevent buckling of the elements inwardly, and the screw 41 being relied upon to prevent outward movement. When both screws 38 and 41 are used, the spacers may be omitted if found unnecessary. The various arrangements have been shown and described in order to illustrate the flexibility of the invention.

While we have shown each tooth as provided with the adjusting means just described, in practice it is often sufficient to confine the adjusting screws to the teeth at the top of each row in a broach. That is to say, the lower teeth may be used to rough out the gear teeth and then the upper teeth of the broach, for example the upper seven, may be used to finish the gear teeth. The holding members 33 are held at approximately fixed distances apart vertically by engagement of the projections 34 in the grooves 35, although a slight amount of vertical adjustment of the broach by means of the screws 25 may take place.

Referring now more particularly to Fig. 14, we have shown therein a means by which the cutting teeth may be assembled. In this figure is shown a temporary base 47 having a central bore in which is placed a plug 49 forming the lower end of an arbor 50. This arbor has a flange 51 forming a shoulder contacting with the top of the base 47, and the arbor extends upwardly concentric with the cage 17, this cage being mounted on a sleeve 52 supported on the base concentric with the plug 49. Preferably, the sleeve 52 is received on an upstanding projection 53 on the base, and the ring 22 of the cage accurately fits this sleeve 52 so that the parts are properly centered. The top of the arbor is provided with a bore 54 adapted to receive a centering plug (not shown), which plug may have parts engaging the cage to accurately center the upper end of the arbor with respect to the cage, the lower end of the arbor being accurately centered by the cooperation of the sleeve 52 and ring 22.

Mounted on the arbor is a plurality of mandrel rings 55, these rings being of different diameters so as to form a stepped frusto-conical surface, as plainly indicated in Fig. 14. Then the cutting teeth may be placed into the grooves 18 between the partitions 19 and adjusted inwardly in those grooves until they contact with one of the rings 55. It is, of course, to be understood that each ring is substantially the height of one of the cutting teeth, and that the teeth will be arranged in circumferential rows, with all the teeth in each row centered by contacting with one of the rings 55. After the teeth are all assembled with their holding members 33 interposed therebetween, the screws 25 may be tightened sufficiently to hold the teeth against the bearing 24, and then the cage may be removed from the mandrel and placed inside the holder 9. The cover 26 may then be fastened in place and any subsequent adjustment found necessary may be made by manipulation of the screws 38 and 41 as described above.

When it is necessary to remove a single tooth due to breakage or other causes, this may be easily done without removing or disturbing other teeth in the tool holder, and even without disturbing other teeth in the broach. All that is necessary, is to loosen the screws 25 for the particular broach in which the tooth is located, and then that tooth may be removed, replaced, and adjusted, after which the screws 25 may be tightened. The teeth are securely held in place by the construction of the cage which forms rigid partitions 19 between adjacent broaches, and preferably these partitions are reinforced by means of screws 56 extending through the holder 9 into the partitions (Fig. 13).

As seen in Fig. 15, each partition is provided with screw holes 57 to receive the screws 56, in the illustrated embodiment there being four such screw holes spaced apart vertically on each partition. Each tooth being received between two holding members, any accidental movement towards or away from the center line of the tool holder is prevented and the adjustment of each tooth obtained by manipulation of the screws 38 and 41 is maintained, the holding members resisting the tendency of the teeth to buckle when the broaches are tightened by means of the screws 25. The use of the holding members is particularly advantageous where the adjusting screws are dispensed with, although they are also useful even with the adjusting screws, because they relieve the screws of strain.

By the use of the arrangement described above, it is possible to simultaneously remove metal from the blank 10 in such a way as to form all of the teeth 58 of a gear at one operation, even when the gear is of substantial thickness as shown in Fig. 17. Each tooth removes a single relatively small chip, and each succeeding chip enlarges the space between adjacent teeth on the gear, the upper teeth in the holder finally giving the required contour to the gear teeth. The entire gear may be formed at one operation, under many circumstances, but where the metal of the blank is too thick to make it feasible to make a machine large enough to remove all the metal between teeth at one operation, two or more machines may be used in succession. Since the flange at the top of the cage is integral with the cage, the pressure exerted against the teeth by the blank during the gear forming operation is transmitted direct to the cage through the flange which forms a rigid non-yielding abutment.

During the cutting operation a suitable lubricant is preferably supplied through the ducts 31, as described above, this lubricant serving to maintain the parts cool, so as to prevent their expansion. Because of the size of the machine and the large force necessary to operate it, a tremendous amount of heat is generated, and it is essential that this heat should be controlled so as to prevent any substantial expansion. For example, if the tool holder should expand, it would not fit the guides 12 and 13, and since these guides fit the holder very accurately, it will be seen that expansion of the holder must be substantially eliminated. This may be done by keeping the cutting elements continually wet with lubricant discharged thereon adjacent the top of the holder, this lubricant running down over the elements and the blank and out the bottom of the holder.

Referring now to Figs. 18, 19, and 20, we have shown therein a different embodiment of cutting element. In this form, the cage 17' is provided with the vertically extending grooves 18 and partitions 19, as in the other embodiment. These grooves, however, now terminate in vertically extending or longitudinal grooves 59 in the outer surface of the cage, of sufficient width to receive the projections 34 of the holding members 33.

If individual teeth are to be used as the cutting elements, then these grooves will extend the full length of the cage, but in the form shown we have used multiple-tooth cutting elements 60 for the greater part of the length of the broaches, using individual teeth as cutting elements only at the top of the broaches. By this arrangement the elements 60 may be used to rough out the work, and then the work may be finished by the individual teeth 20. These individual teeth may be adjusted accurately in the manner described above, by opposing screws 38 and 41, to bring the teeth to exact position. Each element 60 has a plurality of teeth 21', and these elements may be adjustably held in the grooves 18 by means of screws 61, which may be threaded into the elements and may pass through screws 62 similar to the screws 41. This arrangement is not so essential here, however, as the same fine adjustment is not necessary for these roughing-out elements, and in practice these screws 61 and 62 may be omitted. However, they have been shown for the purpose of indicating how they could be used if desired. Preferably threaded in the back of each one of the elements 60 is a plurality of set screws 60' contacting with the inner wall of the holder 9. It is to be remembered that the elements 60 are used for roughing out the blanks, and therefore take the greatest wear. As the teeth 21' on these elements are ground down, the screws 60' may conveniently be used to extend the effective radial thickness of the elements.

In Fig. 18 we have also shown another feature which may be practiced with either form of the invention shown. This feature is the staggering or stepping of the teeth, so that all the teeth in a circumferential row do not begin to act on the blank at the same time. For example, where there are 36 teeth in a circumferential row, these teeth may be conveniently divided into nine groups of four each, the groups being separated by steps 63 extending lengthwise of the tool, and the teeth in each group being separated by steps 63'. Preferably, the steps in each group are equal as are the steps between groups, so that as a result we have the teeth disposed in parallel planes, each substantially normal to the axis of the cylinder, and when the tool is operated, the first teeth 21'' in each group will be the first to engage the blank, which they will do substantially at the same instant. Then the teeth 21 in the next higher plane will all simultaneously engage the work, and so on. That is to say, each tooth in a group acts on a blank substantially simultaneously with a corresponding tooth in each of the other groups.

By this arrangement, there is prevented any sudden shock or succession of shocks, it being seen that the teeth are arranged in spirals so that the entire periphery of the blank is never subjected to the strain of all teeth acting together in a single plane. At the same time, the teeth 21'', for example, are uniformly spaced about the periphery of the blank so as to give a uniform action around the periphery and prevent any strain due to lack of balance which would be caused, for example, if the force exerted on the blank were substantially all on one side at any given instant. Shims 65 of different thicknesses may be used at the top and bottom of the cage, to fit into the ends of the grooves 18 to properly position the elements.

While we have shown the invention as embodied in specific forms, it is to be understood that various changes in details may be made without departing from the scope of the invention, and we therefore do not intend to limit ourselves except by the appended claims.

We claim:

1. In a device for cutting gears and the like, a hollow tool holder, means for supporting within said holder a plurality of broaches spaced around the holder, each broach being formed of a plurality of individual cutting elements, and means to frictionally clamp together the elements in each broach independently of the elements in the other broaches.

2. In a device for cutting gears and the like, a hollow tool holder, means for supporting within said holder a plurality of circumferentially spaced broaches, each broach formed of a plurality of individual cutting elements, holding members each disposed between adjacent elements in a broach, means preventing radial movement of said holding members, and means to clamp the elements on opposite sides of a holding member against said member and thereby prevent radial movement of said elements.

3. In a device for cutting gears and the like, a cylindrical cage having a plurality of spaced vertically extending partitions with continuous spaces therebetween, a plurality of individual cutting elements disposed in a space between two adjacent partitions, and means holding each element in position independently of the others.

4. In a device for cutting gears and the like, a cylindrical cage having a plurality of spaced vertically extending partitions, a plurality of individual cutting elements disposed between two adjacent partitions, and means to clamp said elements in position, said means acting lengthwise of said partitions.

5. In a device for cutting gears and the like, a cylindrical cage having a plurality of spaced vertically extending partitions, a plurality of individual cutting elements disposed between two adjacent partitions, means holding each element in position independently of the others, a cylindrical holder surrounding said cage, and means in said holder and cooperating with said elements for adjusting individual elements towards and away from the center of the cage.

6. In a device for cutting gears and the like, a cylindrical cage having a plurality of spaced vertically extending partitions, a plurality of individual cutting elements disposed between two adjacent partitions, means holding each element in position independently of the others, a cylindrical holder surrounding said cage, means in said holder and cooperating with said elements for adjusting individual elements towards and away from the center of the cage, holding members disposed between adjacent elements and in frictional engagement therewith, and means preventing movement of said holding members towards or away from the center of the cage.

7. In a device for cutting gears and the like, a tool holder having a wall, a row of cutting elements extending along said wall, means to adjust individual elements with respect to the wall, and holding members disposed between adjacent elements and frictionally engaging the same.

8. In a broach or the like, a tool holder having a wall, a plurality of cutting elements disposed in a row along said wall, means on the wall for adjusting individual elements with respect to the wall, means acting in a direction generally parallel to the wall for clamping said elements together, holding members disposed between adjacent elements and frictionally engaging the same, and means preventing movement of said holding members with respect to the wall.

9. In a device for cutting gears and the like, a cylindrical cage having a plurality of spaced vertically extending partitions, a plurality of individual cutting elements disposed between two adjacent partitions, means holding each element in position independently of the others, a cylindrical holder surrounding said cage, means in said holder and cooperating with said elements for adjusting individual elements towards and away from the center of the cage, and holding members disposed between adjacent elements and in frictional engagement therewith, said holding members having laterally extending projections cooperating with said partitions to prevent inward movement of the members.

10. In a device for cutting gears and the like, a cylindrical cage having a plurality of spaced vertically extending partitions, a plurality of individual cutting elements disposed between two adjacent partitions, means holding each element in position independently of the others, a cylindrical holder surrounding said cage, means in said holder and cooperating with said elements for adjusting individual elements towards and away from the center of the cage, holding members disposed between adjacent elements and in frictional engagement therewith, said cage having circumferentially extending grooves on the exterior surface thereof and spaced apart lengthwise of the cage, and said holding members having laterally extending projections received in said grooves.

11. In a device for cutting gears and the like, a cylindrical cage having a plurality of spaced vertically extending partitions, a plurality of individual cutting elements disposed between two adjacent partitions, means holding each element in position independently of the others, a cylindrical holder surrounding said cage, means in said holder and cooperating with said elements for adjusting individual elements towards and away from the center of the cage, said adjusting means comprising a screw threaded in said holder and bearing against an element to force it inwardly, and a second screw threaded in said element and tending to draw it outwardly against the action of said first screw.

12. In a device for cutting gears and the like, a cylindrical cage having a plurality of spaced vertically extending partitions, a plurality of individual cutting elements disposed between two adjacent partitions, means holding each element in position independently of the the others, a cylindrical holder surrounding said cage, means in said holder and cooperating with said elements for adjusting individual elements towards and away from the center of the cage, said adjusting means comprising a screw threaded in said holder and bearing against an element to force it inwardly, and a second screw threaded in said element and tending to draw it outwardly against the action of said first screw, said second screw being received in a longitudinally extending bore in said first screw.

13. In combination, a mandrel having a stepped frusto-conical surface, a cylindrical cage, means for supporting said cage concentrically with respect to said mandrel, and means to assemble cutting elements on said cage in circumferential rows with all the elements in each row contacting with the surface of one of the steps.

14. In combination, a base having an arbor extending upwardly therefrom, a plurality of rings fitting on said arbor, said rings decreasing in diameter from the bottom towards the top to form a series of vertically spaced steps connected by cylindrical surfaces, a cage, means to support said cage concentrically with said arbor and rings, and means to assemble individual cutting elements in said cage in circumferential rows with the elements in each row contacting with one of the surfaces between adjacent steps.

15. In a device for cutting gears and the like, a cylindrical tool holder, a plurality of cutting elements supported on said holder and disposed around the circumference thereof, said elements being arranged in groups with an element in each group substantially on the same circumference of the cylinder as an element in another group but with the groups separated from each other by steps extending lengthwise of the cylinder, with the steps spaced apart equally both circumferentially of the cylinder and longitudinally thereof.

16. In a device for cutting gears and the like, a cylindrical tool holder, a plurality of cutting elements supported on said holder and disposed around the circumference thereof, said elements being arranged in groups with an element in each group substantially on the same circumference of the cylinder as an element in another group but with the groups separated from each other by steps extending lengthwise of the cylinder, and the teeth in each group likewise being separated by steps.

17. In a device for cutting gears and the like, a tool holder having a wall, a row of cutting elements extending along said wall, said elements being arranged in groups separated by steps and the teeth in each group likewise being separated by steps, and means for moving said holder in a direction generally parallel to said steps whereby the elements in said groups will act in succession upon the work, said steps being so arranged that each tooth in a group acts on a blank simultaneously with a tooth in each of the other groups.

18. In a device for cutting gears and the like, a cylindrical tool holder, a plurality of cutting elements on said holder and having teeth disposed around the circumference thereof, said teeth being arranged in a plurality of planes normal to the axis of the cylinder, with circumferentially adjacent teeth disposed in different planes.

19. In a device for cutting gears and the like, a cylindrical tool holder, a plurality of cutting elements on said holder and having teeth disposed around the circumference thereof, said teeth being arranged in a plurality of planes normal to the axis of the cylinder, with circumferentially adjacent teeth disposed in different planes but with a plurality of teeth equally spaced circumferentially and disposed in the same plane to act on the gear substantially simultaneously.

20. In a device for cutting gears and the like, a cylindrical tool holder, a plurality of cutting elements on said holder and spaced apart circumferentially thereof and forming a plurality of broaches extending lengthwise of the holder, and means for supporting a blank adjacent said holder, said elements first contacting with the blank being formed with a plurality of teeth, and those elements last contacting with the blank comprising individual teeth.

21. In a device for cutting gears and the like, a cylindrical tool holder, a plurality of cutting elements on said holder and spaced apart circumferentially thereof and forming a plurality of broaches extending lengthwise of the holder, means for supporting a blank adjacent said holder, said elements first contacting with the blank being formed with a plurality of teeth, and those elements last contacting with the blank comprising individual teeth, and means for adjusting said individual teeth each independently of the other.

22. In a device for cutting gears and the like from a blank, a tool holder having a wall, a plurality of broaches each adapted to remove substantially all the metal from between adjoining teeth of a gear, said broaches being disposed along said wall and each broach comprising a plurality of cutting elements arranged to successively operate upon the gear blank, the elements in said broaches being staggered lengthwise of the broaches, and means for moving said holder lengthwise of the broaches.

23. In a device for cutting gears and the like from a blank, a tool holder having a wall, a plurality of broaches each adapted to remove substantially all the metal from between adjoining teeth of a gear, said broaches being disposed along said wall and each broach comprising a plurality of cutting elements arranged to successively operate upon the gear blank, said broaches being arranged in groups along the wall, with the cutting elements of said groups separated by steps extending lengthwise of the broaches, and means for moving said holder lengthwise of the broaches.

24. In a device for cutting gears and the like from a blank, a tool holder having a wall, a plurality of broaches each adapted to remove substantially all the metal from between adjoining teeth of a gear, said broaches being disposed along said wall and each broach comprising a plurality of cutting elements arranged to successively operate upon the gear blank, said broaches being arranged in groups along the wall, with the cutting elements of said groups separated by steps extending lengthwise of the broaches and with the cutting elements of the broaches in each group likewise separated by steps extending lengthwise of the broaches, and means for moving said holder lengthwise of the broaches.

25. In a device for cutting gears and the like from a blank, a tool holder having a wall, a plurality of broaches each adapted to remove substantially all the metal from between adjoining teeth of a gear, said broaches being disposed along said wall and each broach comprising a plurality of cutting elements arranged to successively operate upon the gear blank, said broaches being arranged in groups along the wall, with the cutting elements of said groups separated by steps extending lengthwise of the broaches and with the cutting elements of the broaches in each group likewise separated by steps extending lengthwise of the broaches and with an element in each group in a plane with an element in each of the other groups, and means for moving said holder lengthwise of the broaches.

26. In a device for cutting gears and the like from a blank, a tool holder having a wall, a plurality of broaches each adapted to remove substantially all the metal from between adjoining teeth of a gear, said broaches being disposed along said wall and each broach comprising a plurality of cutting elements arranged to successively operate upon the gear blank, said broaches being arranged in groups along the wall, with the cutting elements of said groups separated by steps extending lengthwise of the broaches and with the cutting elements of the broaches in each group likewise separated by steps extending lengthwise of the broaches and with each element in a group in a plane with a corresponding element in each of the other groups, and means for moving said holder lengthwise of the broaches.

27. In a device for cutting gears and the like, a hollow tool holder, means for supporting within said holder a plurality of circumferentially spaced broaches, each broach formed of a plurality of individual cutting elements, means for supporting each element in place in the holder, said supporting means being adapted to permit movement of each element towards and away from the center of the holder, and means for adjusting each element independently of the others either towards or away from said center of the holder.

HARTFORD NATIONAL BANK
AND TRUST COMPANY,
By PHILLIP H. GRAHAM,
    *Associate Trust Officer*,
*Executor of the Estate of John C. Chapman, Deceased.*
FRIEDERICH MÜLLER.